(12) United States Patent
Agari et al.

(10) Patent No.: US 8,390,598 B2
(45) Date of Patent: Mar. 5, 2013

(54) TOUCH SCREEN, TOUCH PANEL AND DISPLAY DEVICE

(75) Inventors: Masafumi Agari, Tokyo (JP); Takeshi Ono, Tokyo (JP); Naoki Nakagawa, Tokyo (JP); Isao Nojiri, Tokyo (JP); Hiroyuki Murai, Tokyo (JP); Takahiro Nishioka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/550,737

(22) Filed: Jul. 17, 2012

(65) Prior Publication Data

US 2012/0293457 A1    Nov. 22, 2012

Related U.S. Application Data

(62) Division of application No. 12/553,659, filed on Sep. 3, 2009, now Pat. No. 8,269,744.

(30) Foreign Application Priority Data

Sep. 5, 2008   (JP) ................................ 2008-227885
Oct. 20, 2008  (JP) ................................ 2008-269556

(51) Int. Cl.
   *G06F 3/044*   (2006.01)
(52) U.S. Cl. ........................................ 345/174; 345/173
(58) Field of Classification Search ........................ None
   See application file for complete search history.

(56) References Cited

U.S. PATENT DOCUMENTS

| 5,844,506 | A | 12/1998 | Binstead |
| 7,129,935 | B2 | 10/2006 | Mackey |
| 7,202,859 | B1 | 4/2007 | Speck et al. |
| 8,174,510 | B2 * | 5/2012 | Polishchuk et al. .......... 345/174 |
| 2007/0229470 | A1 | 10/2007 | Snyder et al. |
| 2010/0026664 | A1 | 2/2010 | Geaghan |

FOREIGN PATENT DOCUMENTS

| JP | 9-511086 | 11/1997 |
| JP | 11-110115 | 4/1999 |
| JP | 2006-344163 | 12/2006 |

* cited by examiner

*Primary Examiner* — Joseph Haley
(74) *Attorney, Agent, or Firm* — Oblon, Spivak, McClelland, Maier & Neustadt, L.L.P.

(57) ABSTRACT

A detection column wiring includes a set of a first metal wiring having a zigzag pattern and a second metal wiring having a structure axisymmetric with the first metal wiring about a column direction. The first metal wiring includes first sloped portions obliquely sloped by an inclination angle of 45° with respect to the column direction, and first parallel portions parallel with the column direction and continuous with the first sloped portions; the first sloped portions and the first parallel portions being repeatedly placed in a zigzag shape along the column direction. Each detection row wiring has the same structure. A sloped portion of the first sloped portions of the first metal wiring is always orthogonally and spatially intersected, at its middle point, with a sloped portion of the second sloped portions of the third metal wiring at its middle point. Other portions have the same orthogonal relationship.

11 Claims, 13 Drawing Sheets

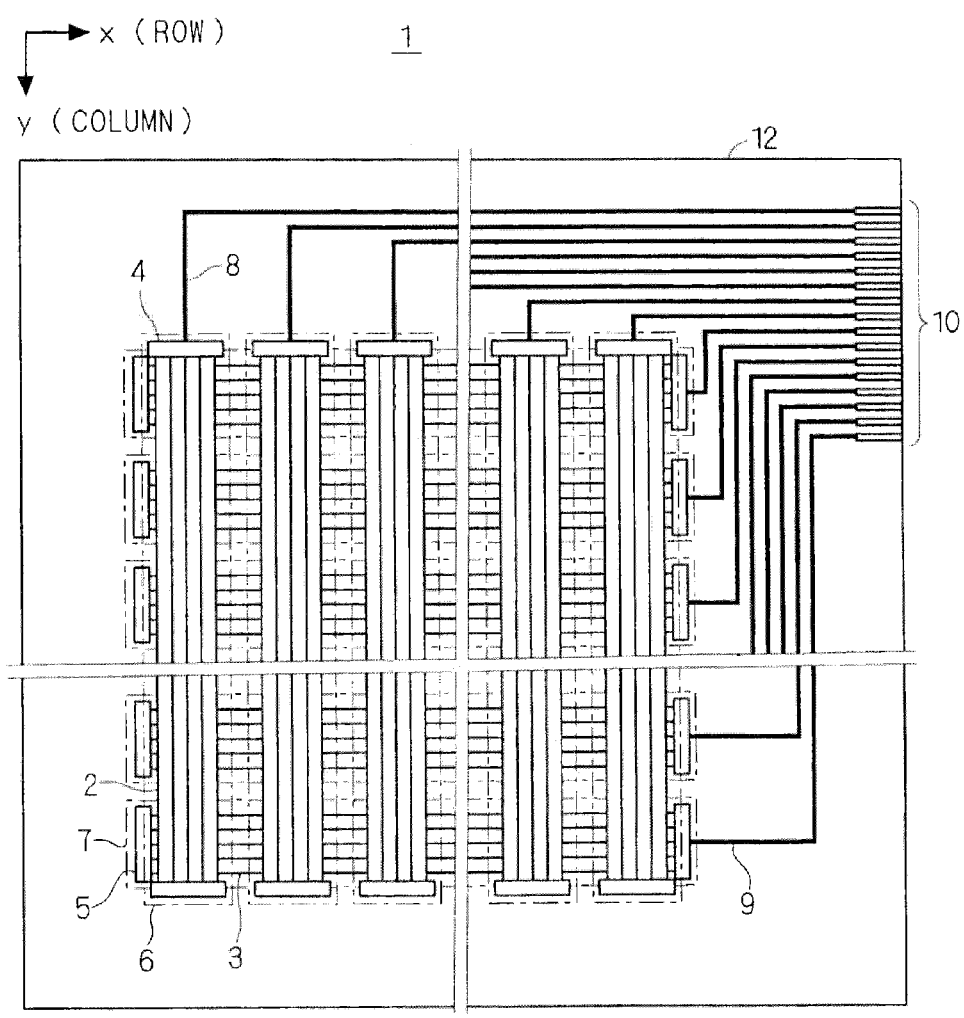
F I G . 1

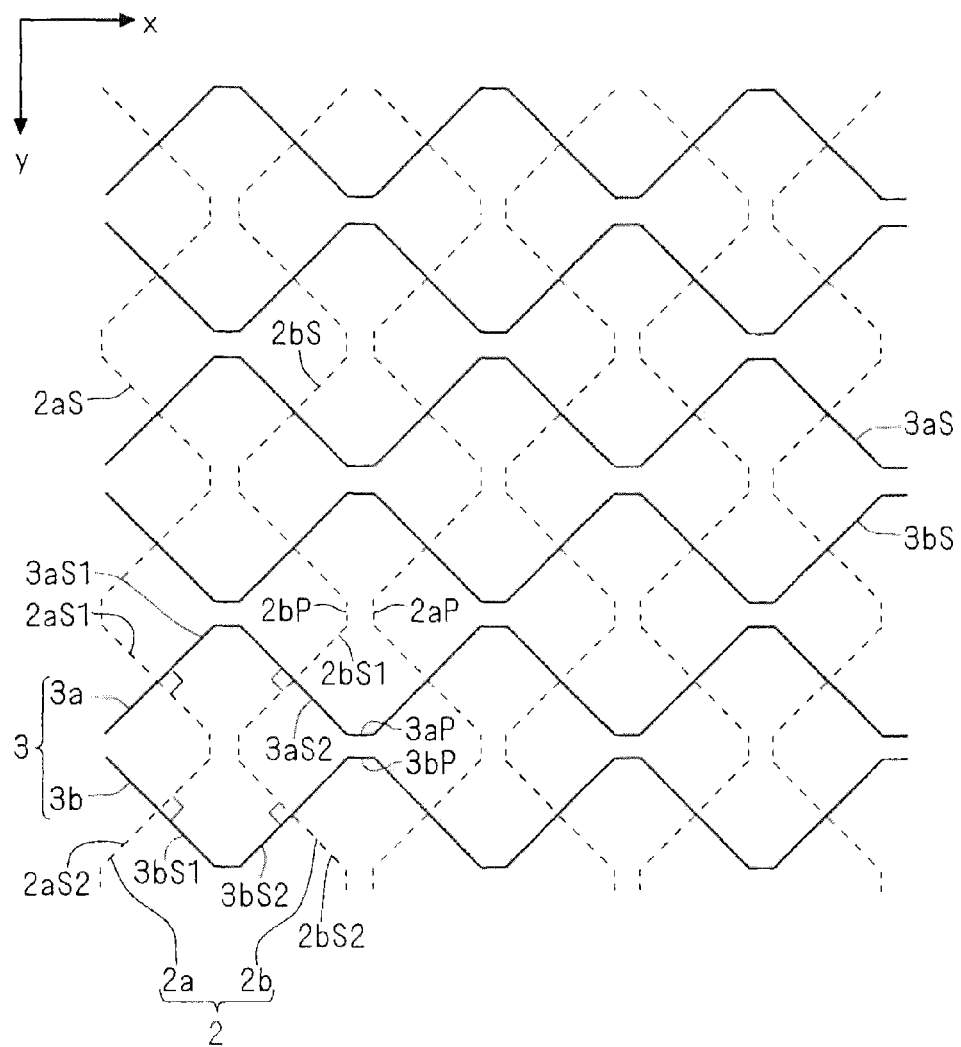
F I G . 2

F I G . 5
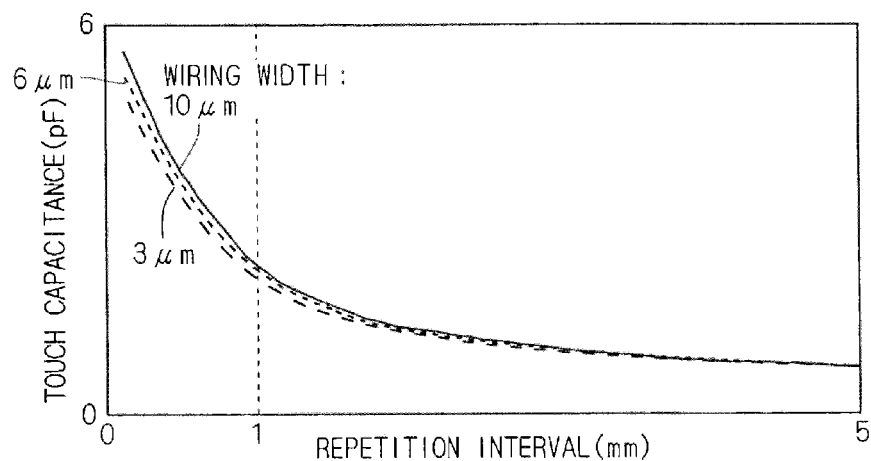
F I G . 6
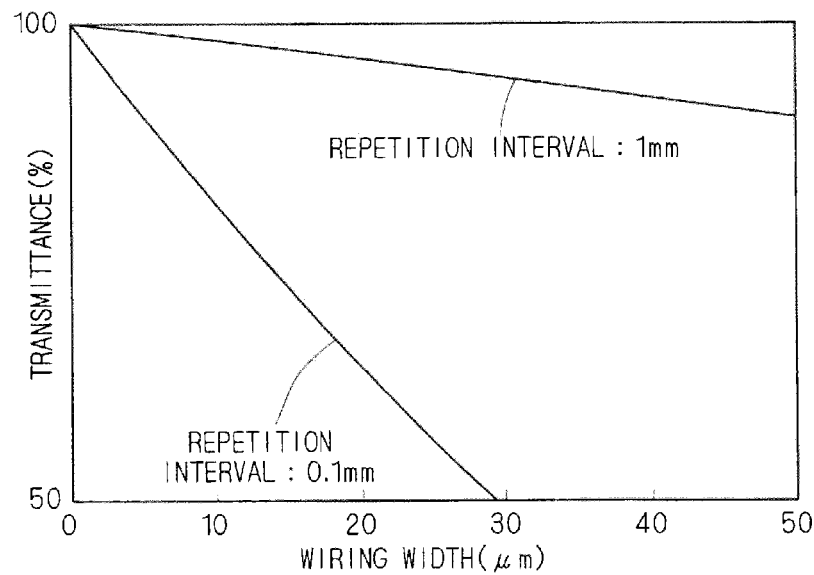

F I G . 9
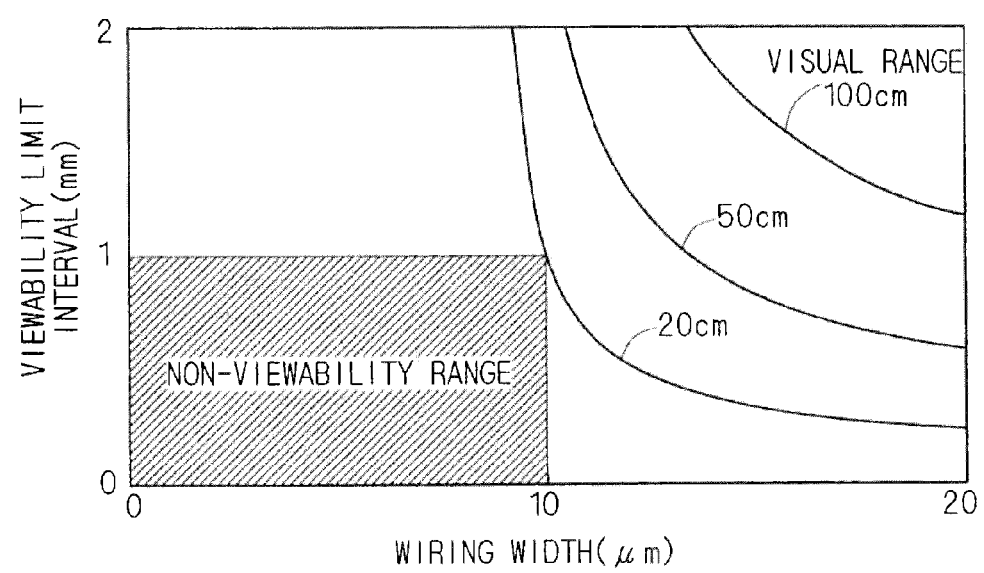

F I G . 1 2
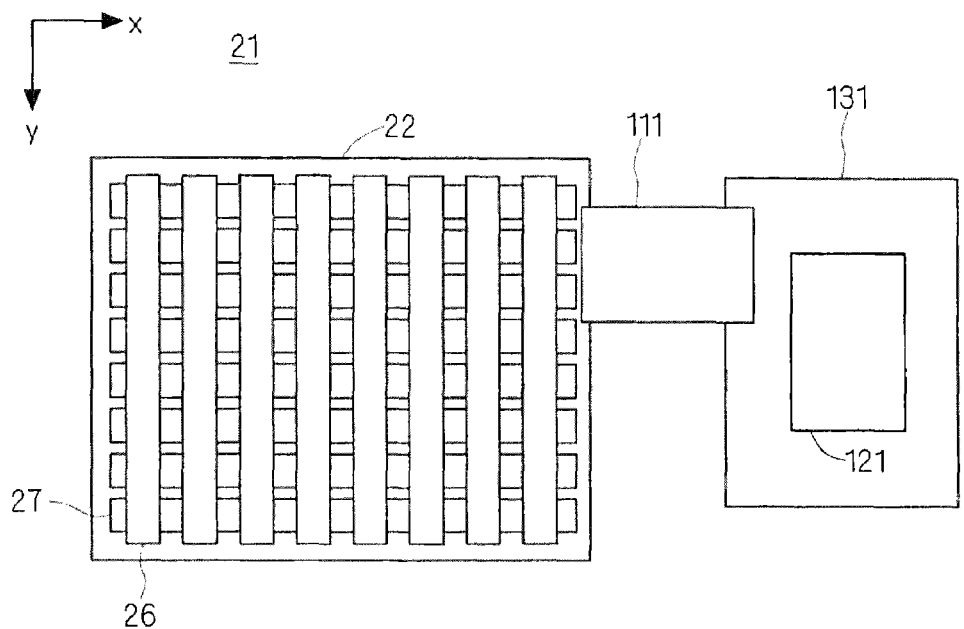
F I G . 1 3
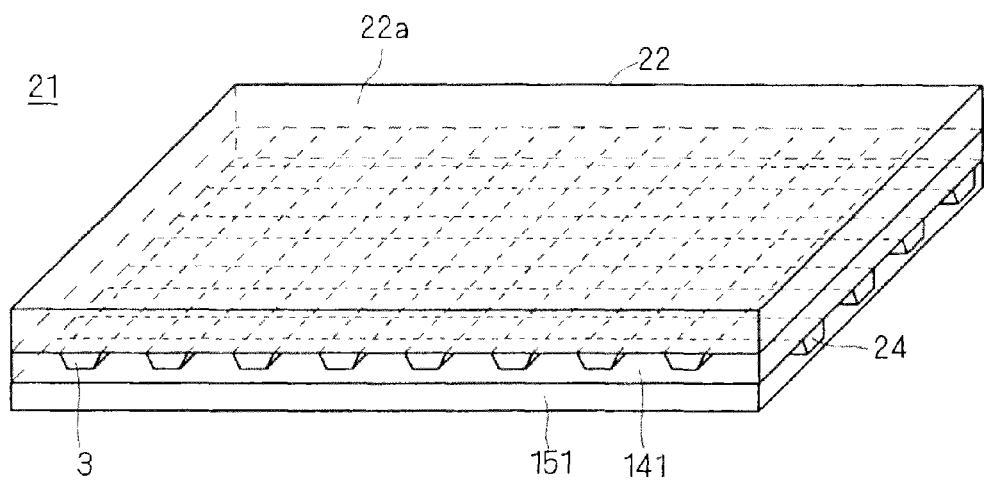

F I G . 1 6
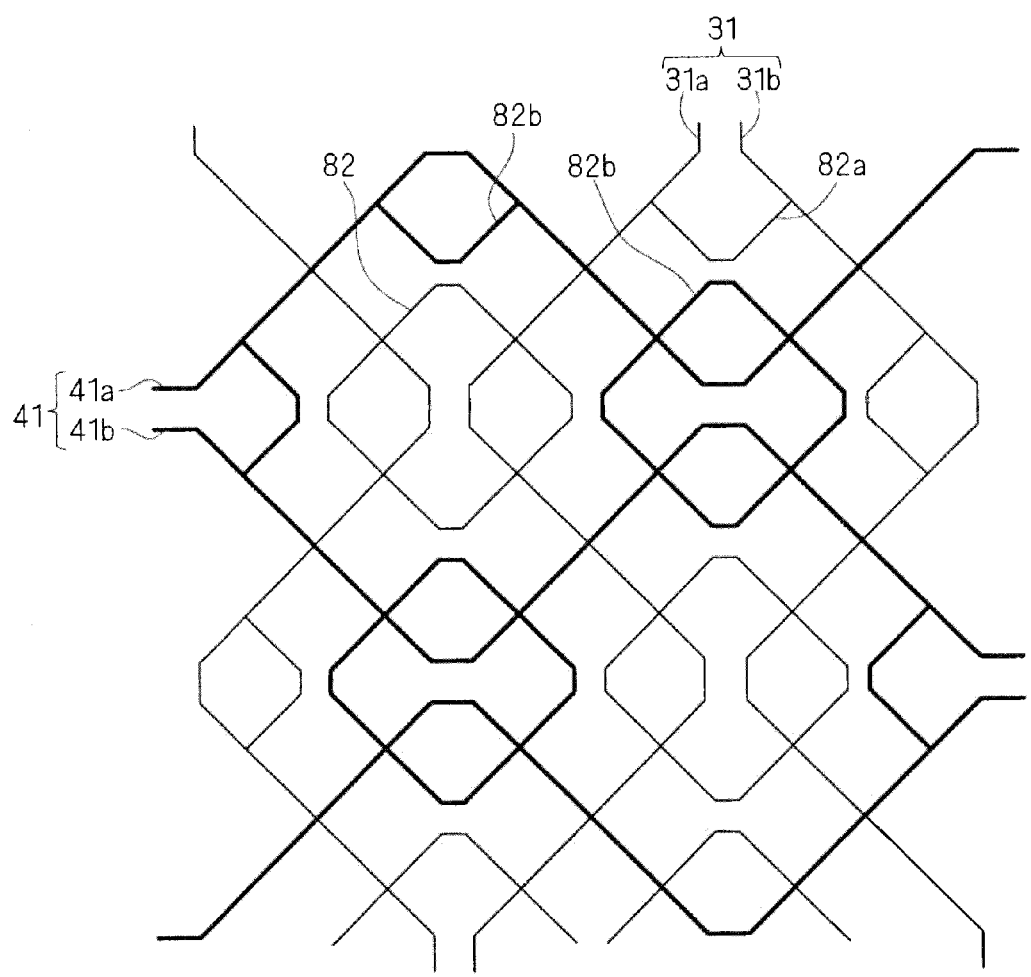

TOUCH SCREEN, TOUCH PANEL AND DISPLAY DEVICE

CROSS REFERENCE TO RELATED APPLICATIONS

This application is a Division of and claims the benefit or priority under 35 U.S.C. §120 from U.S. Ser. No. 12/553,659, filed Sep. 3, 2009, and claims the benefit of priority under 35 U.S.C. §119 from Japanese Patent Application Nos. 2008-227885, filed Sep. 5, 2008 and 2008-269556, filed Oct. 20, 2008, the entire contents of each of which are incorporated herein by reference.

BACKGROUND OF THE INVENTION

1. Field of the Invention

The present invention relates to increasing of the size of a touch screen in a touch panel.

2. Description of the Related Art

Attention has been focused on touch panels capable of detecting touches of a pointing body such as a finger thereon and identifying the coordinates of the position thereof, as one of excellent user interface devices. Touch panels of various types, such as resistance-film types or capacitance types, have been produced.

Among these types, as one of capacitance types, there is a Projected Capacitive Touchscreen type capable of detecting touches of pointing bodies thereon, even when the touch screen incorporating touch sensors is covered at its front surface with a protective film, such as a glass plate with a thickness of about several millimeters. This Projected Capacitive Touchscreen type has the advantage that it offers excellent rigidity since a protective film can be placed on its front surface, the advantage that it is capable of detecting touches of even gloved fingers thereon, and the advantage that it has a long lifetime since there is no operating portion, and the like.

For example, a conventional touch panel of the Projected Capacitive Touchscreen type includes a touch screen including, as detection conductors for detecting capacitances, a first series of conductor elements formed on a thin dielectric layer, and a second series of conductor elements formed to be separated from the first series of conductor elements with an insulation layer interposed therebetween, such that there are spatially formed a plurality of intersection points, without inducing electric contacts among the conductor elements (refer to National Publication of Translation No. 09-511086, for example). Optimum materials of the conductor elements are metal materials, such as silver. Further, in view of display, the visibility of the conductor elements becomes a problem, and, in cases of reducing the visibility, a transparent conductive layer made of indium oxide and the like is employed as conductor elements. Also, instead of the conductor elements, thin conductor wires can be employed as detection wirings in touch panels.

Further, the conductor elements for detecting capacitances are connected to a capacitance control oscillator, through an output line and a multiplexer. A divider counts the output therefrom to create capacitance detection data.

In cases of forming the detection wirings in such a touch panel from transparent conductive layers, there is a low possibility of degradation of the quality of the display on the display device equipped with the touch panel, but there is the problem of difficulty in increasing the size of the touch panel, due to the high resistance of the transparent conductive layers forming the detection wirings.

To cope therewith, use of metal layers as detection wirings is conceived, in order to reduce the resistance of the detection wirings to realize an increase of the size of the touch panel. However, in this case, the detection wirings can be visually recognized through reflected light, thereby inducing the problem of degradation of the display quality.

Therefore, in order to reduce the resistance of the detection wirings and also to reduce the reflected light for preventing the detection wirings from being visually recognized through the reflected light for realizing an increased size of the touch panel, thin metal conducive wires are used as the detection wirings. However, in this case, if a structure including detection wirings made of thin metal conducive wires with an increased wiring density is employed for detecting the large area, this induces large parasitic capacitances among the column metal conductive wires and the row metal conductive wires, thereby inducing the problem of the occurrence of delays in wirings.

Further, in such a conventional touch panel, if the first and second series of conductor elements are made of a transparent material, it is possible to provide a touch panel with excellent viewability, but conventional transparent materials have high electric resistances, which has induced the problem of reduction of the response speed. In order to overcome this fact, there has been suggested formation of the first and second series of conductor elements from a non-transparent material with high conductivity, such as silver, but, in this case, a light-transmittance difference is induced between the portions including the detection wirings and the portions including no detection wirings, which has induced the problem of the occurrence of display unevenness due to the periodic change of the light transmittance.

Further, when such a touch panel is mounted to a display device, there has been induced the problem of the occurrence of moires due to the interference of the aforementioned periodic change of the light transmittance with the periodically-arranged pixels in the display device.

SUMMARY OF THE INVENTION

The present invention was made for overcoming these problems. It is a first object of the present invention to realize a large-sized touch panel capable of reducing the parasitic capacitances for increasing the sensitivity for detecting the capacitances and, also, capable of making it harder to visually recognize detection wirings, in increasing the size of the touch panel using detection wirings made of metal conductive wires and, further, to provide a display device including the touch panel.

Further, it is a second object to provide a touch panel having a high response speed and being capable of exhibiting reduced display unevenness and moires.

A touch screen according to an aspect of the present invention is a touch screen including a plurality of detection column wirings each extending in a column direction and a plurality of detection row wirings each extending in a row direction which are placed such that they are spatially intersected with each other on a back surface of a transparent base substrate with an insulation layer interposed therebetween, each predetermined number of detection column wirings, out of the plurality of detection column wirings, being electrically connected to one another at their respective opposite ends to constitute a bundle of wirings in the column direction, and each bundle of wirings in the column direction being constituted by detection column wirings which belong to this bundle of wirings in the column direction and are repeatedly arranged in the row direction at predetermined intervals, and each predetermined number of detection row wirings, out of the plurality of detection row wirings, being electrically connected to one another at their respective opposite ends to constitute a bundle of wirings in the row direction, and each bundle of wirings in the row direction being constituted by detection row wirings which belong to this bundle of wirings in the row direction and are repeatedly arranged in the column direction at predetermined intervals, wherein the detection column wirings are constituted by a set of a first metal wiring having a zigzag pattern and a second metal wiring having a structure axisymmetric with the first metal wiring about the column direction as an axis, and the first metal wiring is constituted by first sloped portions which are obliquely sloped by a predetermined angle with respect to the column direction and first parallel portions which are parallel with the column direction and are continuous with the first sloped portions, such that the first sloped portions and the first parallel portions are repeatedly placed along the column direction, the detection row wirings are constituted by a set of a third metal wiring having a zigzag pattern and a fourth metal wiring having a structure axisymmetric with the third metal wiring about the row direction as an axis, and the third metal wiring is constituted by second sloped portions which are obliquely sloped by a predetermined angle with respect to the row direction and second parallel portions which are parallel with the row direction and are continuous with the second sloped portions, such that the second sloped portions and the second parallel portions are repeatedly placed along the row direction, in each area in which an arbitrary single detection column wiring out of the plurality of detection column wirings and an arbitrary single detection row wiring out of the plurality of detection row wirings are spatially intersected with each other, a single sloped portion out of the two first sloped portions of the first metal wiring belonging to the area is spatially intersected with a single sloped portion out of the two second sloped portions of the third metal wiring belonging to the area, and the other sloped portion out of the two first sloped portions of the first metal wiring belonging to the area is spatially intersected with a single sloped portion out of the two second sloped portions of the fourth metal wiring belonging to the area, and a single sloped portion out of the two first sloped portions of the second metal wiring belonging to the area is spatially intersected with the other sloped portion out of the two second sloped portions of the third metal wiring belonging to the area, and the other sloped portion out of the two first sloped portions of the second metal wiring belonging to the area is spatially intersected with the other sloped portion out of the two second sloped portions of the fourth metal wiring belonging to the area.

With the aforementioned touch screen, it is possible to optimize the pattern shape of the detection wirings formed form metal wirings, which results in reduction of the parasitic capacitances among the detection column wirings and the detection row wirings and an increase of the wiring density of the detection wirings, thereby providing a large-sized Projected Capacitive Touchscreen type touch screen having a higher capacitance detection sensitivity.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a plan view schematically illustrating the structure of a touch screen included in a touch panel according to a first embodiment;

FIG. 2 is a transparent transverse cross-sectional view of a portion of the touch screen which, for ease of understanding of the structures of detection column wirings and detection row wirings, schematically illustrates detection wirings in an enlarging manner;

FIG. 5 is a view illustrating the relationship between a wiring width of the detection wirings and a touch capacitance, according to a second embodiment;

FIG. 6 is a view illustrating the relationship between the wiring width of the detection wirings and the transmittance, according to the second embodiment;

FIG. 9 is a view illustrating the relationship between the wiring width of the detection wirings and a viewability limit interval, according to the third embodiment;

FIG. 12 is a plan view illustrating the connection between a touch screen and a controller substrate according to a fifth embodiment;

FIG. 13 is a perspective view schematically illustrating the layer structure of the touch screen according to the fifth embodiment;

FIG. 16 is a plan view illustrating, in an enlarging manner, the wiring pattern in a touch screen according to a sixth embodiment.

DETAILED DESCRIPTION OF THE PREFERRED EMBODIMENTS

First Embodiment

Figure 3:
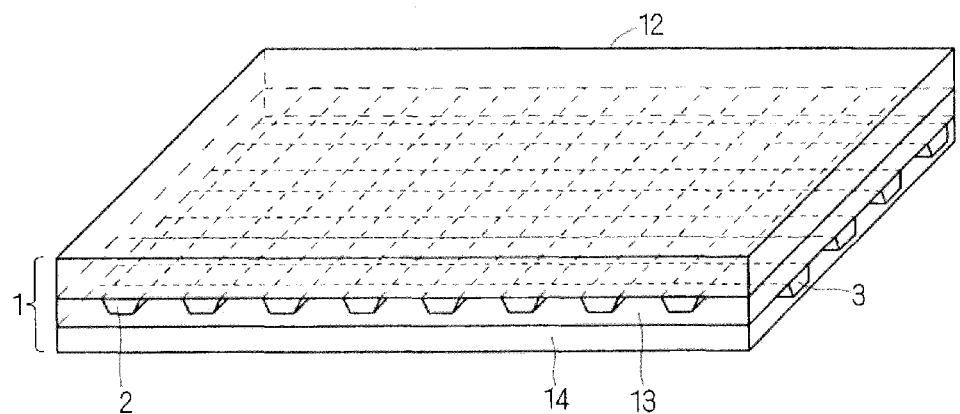
FIG. 3 is a perspective cross-sectional view schematically illustrating a portion of the layer structure of the touch screen included in the touch panel according to the first embodiment.

FIG. 1 is a plan view schematically illustrating the structure of a touch screen 1 included in a touch panel according to the present embodiment. Further, FIG. 2 is a transparent transverse cross-sectional view of a portion of the touch screen 1 schematically illustrating the detection wirings in an enlarging manner for ease of understanding of the structures of detection column wirings 2 and detection row wirings 3. Hereinafter, with reference to FIG. 1 and FIG. 2, the structure of the touch screen 1 will be described. Further, in the following respective drawings including the cases of second and third embodiments which will be described later, like reference characters used in the respective drawings designate like or corresponding components.

As illustrated in FIG. 1, the touch screen 1 includes, on a transparent substrate 12, (1) a plurality of detection column wirings 2 which are extended in a column direction (corresponding to a y direction in FIG. 1) and are repeatedly arranged in a row direction (corresponding to an x direction in FIG. 1) at predetermined first intervals and, further, (2) a plurality of detection row wirings 3 which are extended in the row direction x and are repeatedly arranged in the column direction y at predetermined second intervals. Further, the predetermined number of detection column wirings 2 are electrically connected at their upper and lower ends to one another through a connection wiring 4 to constitute a single bundle 6 of wirings in the column direction. Similarly, the predetermined number of detection row wirings 3 are electrically connected at their left and right ends to one another through a connection wiring 5 to constitute a single bundle 7 of wirings in the row direction. Further, the predetermined number of bundles 6 of wirings in the column direction are arranged in parallel in the row direction x and, similarly, the predetermined number of bundles 7 of wirings in the row direction are arranged in parallel in the column direction y. Accordingly, the touch screen 1 is spatially divided into the predetermined number of areas, by the spatial intersection of the predetermined number of the bundles 6 of wirings in the column direction and the predetermined number of the bundles 7 of wirings in the row direction. In the case of employing the aforementioned structure, the wiring density of the detection column wirings and the detection row wirings is increased, which can ensure a touch capacitance having a large value. The touch capacitance will be described later.

Further, as illustrated in FIG. 2, each detection column wiring 2 is constituted by a set of (1) a first metal wiring 2a having a zigzag pattern and (2) a second metal wiring 2b having a structure axisymmetric with the first metal wiring 2a about the column direction y as an axis, wherein the first metal wiring 2a is constituted by first sloped portions 2aS which are obliquely sloped by an inclination angle of 45 degrees with respect to the column direction y, and first parallel portions 2aP which are parallel with the column direction y and are continuous with the first sloped portions 2aS, such that the first sloped portions 2aS and the first parallel portions 2aP are repeatedly placed in a zigzag shape along the column direction y.

Similarly, each detection row wiring 3 is constituted by a set of (3) a third metal wiring 3a having a zigzag pattern and (4) a fourth metal wiring 3b having a structure axisymmetric with the third metal wiring 3a about the row direction x as an axis, wherein the third metal wiring 3a is constituted by second sloped portions 3aS which are obliquely sloped by an inclination angle of 45 degrees with respect to the row direction x, and second parallel portions 3aP which are parallel with the row direction x and are continuous with the second sloped portions 3aS, such that the second sloped portions 3aS and the second parallel portions 3aP are repeatedly placed in a zigzag shape along the row direction x.

Furthermore, there is established a positional relationship as follows, in each area in which an arbitrary single detection column wiring, out of the plurality of detection column wirings 2, and an arbitrary single detection row wiring, out of the plurality of detection row wirings 3, are spatially intersected with each other.

Namely, a single sloped portion 2aS1 out of the two first sloped portions 2aS of the first metal wiring 2a belonging to each area is always orthogonally and spatially intersected, at its middle point (the center portion), with a single sloped portion 3aS1 out of the two second sloped portions 3aS of the third metal wiring 3a belonging to this area at its middle point (the center portion). Further, the other sloped portion 2aS2 out of the two first sloped portions 2aS of the first metal wiring 2a belonging to this area is always orthogonally and spatially intersected, at its middle point (the center portion), with a single sloped portion 3bS1 out of the two second sloped portions 3bS of the fourth metal wiring 3b belonging to this area at its middle point (the center portion). In addition thereto, a single sloped portion 2bS1 out of the two first sloped portions 2bS of the second metal wiring 2b belonging to this area is always orthogonally and spatially intersected, at its middle point (the center portion), with the other sloped portion 3aS2 out of the two second sloped portions 3aS of the third metal wiring 3a belonging to this area at its middle point (the center portion). Further, the other sloped portion 2bS2 out of the two first sloped portions 2bS of the second metal wiring 2a belonging to this area is always orthogonally and spatially intersected, at its middle point (the center portion), with the other sloped portion 3bS2 out of the two second sloped portions 3bS of the fourth metal wiring 3b belonging to this area at its middle point (the center portion). Due to the setting of this orthogonal relationship among the sloped portions, it is possible to minimize the sizes of the respective parallel portions 2aP, 2bP, 3aP and 3bP in this area in the row direction x.

By employing the aforementioned structure illustrated in FIG. 2, it is possible to minimize the values of the line-to-line capacitances (the parasitic capacitances) induced among the detection column wirings 2 and the detection row wirings 3. Further, in a plan view of the portions including no detection column wirings 2 and no detection row wirings 3, by this structure, it is possible to make the entire area of these portions significantly smaller than in cases of not employing this structure, which enables uniformly detecting, in each area, the touch capacitance constituted by the capacitance between the detection column wiring 2 and a pointing body, such as a finger, and the capacitance between the detection row wiring 3 and the pointing body.

Further, when a display panel (for example, an LCD panel) to be mounted to the touch screen 1 is mounted to the touch screen 1 such that the row direction x and the column direction y of the touch screen 1 having the present structure are parallel to the row direction and the column direction of the pixel pattern in the aforementioned display panel, respectively, the respective zigzag patterns 2a, 2b, 3a and 3b in the detection column wirings 2 and the detection row wirings 3 are placed with respect to the respective pixels in oblique directions inclined by an angle of 45 degrees with respect to the directions of the arrangement of the pixel patterns in the row direction and the column direction, so that the zigzag patterns 2a, 2b, 3a and 3b uniformly cover portions of the respective pixels. This can uniformize the transmittance when display light emitted from the display panel passes through the touch screen 1, thereby reducing the occurrence of moire phenomena.

As illustrated in FIG. 1, the bundles 6 of wirings in the column direction and the bundles 7 of wirings in the row direction are connected to terminals 10 through deriving wirings 8 and 9, respectively. However, in this case, for convenience of illustration, the deriving wirings 8 and 9 are both illustrated as a single wiring, but, in actual, a single deriving wiring is placed for each of the detection column wirings 2 and the detection row wirings 3 constituting the respective bundles 6 and 7 of wirings.

In FIG. 1, when a pointing body such as a finger touches a surface of a transparent base substrate in the touch screen 1, which will be described later, a touch capacitance is formed between the pointing body and each of the detection column wirings 2 and the detection row wirings 3 constituting the groups of detection wirings (hereinafter, the detection column wirings 2 and the detection row wirings 3 will be comprehensively referred to as "detection wirings").

Further, the numbers of the bundles 6 and 7 of wirings, and the numbers of the detection wirings constituting the respective bundles 6 and 7 of wirings are selected as required, according to the required resolution for the position on the touch panel which has been touched by a pointing body (the values of the touched coordinates).

Next, with reference to FIG. 3, the layer structure of the touch screen 1 will be described. The upper surface layer in the touch screen 1 is a transparent substrate 12 (hereinafter, referred to as a "base substrate 12") made of a transparent glass material or a transparent resin, and a plurality of detection column wirings 2 made of a metal wiring material, such as aluminum, are formed on a back surface of the base substrate 12. In this case, for convenience of illustration, the detection column wirings 2 are not illustrated as having a structure having the aforementioned zigzag pattern. Further, on the back surface of the base substrate 12, a transparent interlayer insulation layer 13, such as a silicon nitride layer or a silicon oxide layer, is formed such that it covers all the detection column wirings 2, and a plurality of detection row wirings 3 made of a metal wiring material, such as aluminum, are formed on a back surface of the interlayer insulation layer 13. In this case, similarly, the detection row wirings 3 are not illustrated as having a structure having the aforementioned zigzag pattern, for convenience of illustration. Also, it is possible to inversely set the positions at which the detection column wirings 2 and the detection row wirings 3 are placed, such that the detection row wirings 3 are formed on the back surface of the base substrate 12, and the detection column wirings 2 are formed on the back surface of the interlayer insulation layer 13.

Figure 4:
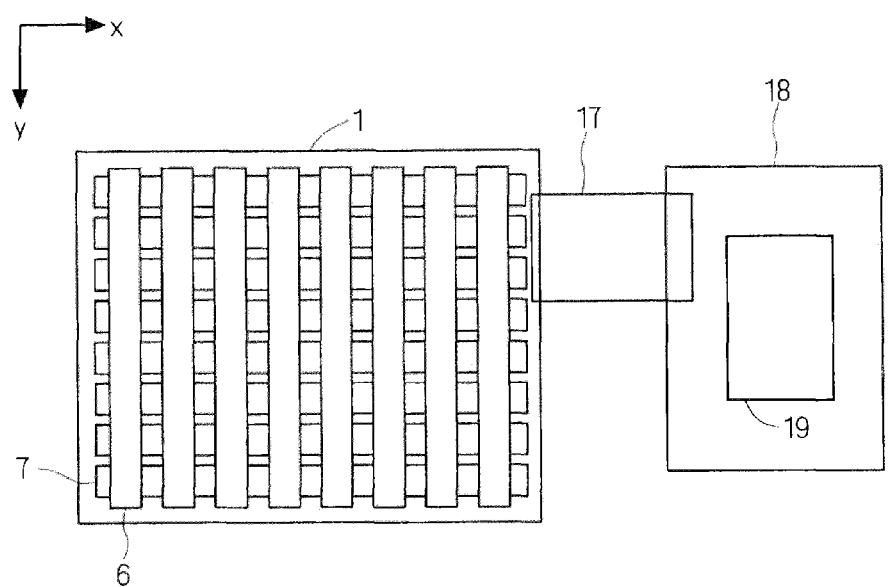
FIG. 4 is a view schematically illustrating the entire structure of the touch panel according to the first embodiment.

FIG. 4 is a view schematically illustrating the entire structure of the touch panel according to the present embodiment. Corresponding terminals in an FPC (Flexible Printed Circuit) 17 are mounted to the respective terminals 10 (not illustrated in FIG. 4, and refer to FIG. 1) in the touch screen 10, by using an ACF (Anisotropic Conductive Film) and the like. The groups of the detection wirings in the touch screen 1 are electrically connected, at their end portions, to a controller substrate 18, through the FPC 17, so that the touch screen 1 illustrated in FIGS. 1 to 3 functions as a main component of the touch panel. Further, on the controller substrate 18, there is mounted (1) a switching circuit (not illustrated) for selecting, in order, each of the plurality of detection column wirings 2 and each of the plurality of detection row wirings 3 and, further, there is mounted (2) a detection processing circuit 19 which executes processing for calculating the touched coordinates at the position on the touch screen 1 which has been touched by a pointing body, based on the result of the detection of the touch capacitance constituted by the capacitance formed between the pointing body and a detection column wiring 2 selected by the switching circuit and, also, the capacitance formed between the pointing body and a detection row wiring selected by the selection switching circuit. Further, the values of the touched coordinates at the position on the touch screen 1 which has been touched by the pointing body, which have been resulted from the calculation by the detection processing circuit 19, are outputted, as detected coordinate data, to an external computer (not illustrated) or the like.

By employing the aforementioned structure according to the present embodiment, it is possible to increase the wiring density without increasing the parasitic capacitances. This enables provision of a touch panel capable of having a large size without degrading the capacitance detection sensitivity and, also, enables provision of a display device including the same.

Second Embodiment

The present embodiment is characterized in that, in addition to use of the structure of the touch screen 1 according to the first embodiment, a repetition interval of the detection wirings 2 and 3 (a first interval and a second interval) are set to dimension values which are equal to or less than 1 mm but are larger than the interval of the arrangement of the pixel pattern in the display panel to be mounted to the touch screen 1.

FIG. 5 is a view illustrating the results of calculations using an electromagnetic field solver, for the relationship between the repetition interval of the detection wirings 2 and 3 in the touch screen 1 structured according to the aforementioned first embodiment and the touch capacitance in a case where the thickness of the base substrate 12 made of glass or the like is about 1 mm, in respective cases where a wiring width of the detection wirings 2 and 3 is 3 micrometers, 6 micrometers and 10 micrometers. As illustrated in FIG. 5, if the repetition interval of the detection wirings 2 and 3 exceeds 1 mm, the touch capacitance is reduced due to the reduction of the wiring density, which makes the capacitance detection sensitivity insufficient. On the other hand, when the repetition interval of the detection wirings 2 and 3 is equal to or less than 1 mm, the touch capacitance is significantly larger, thereby offering a sufficient capacitance detection sensitivity, regardless of the value of the wiring width of the detection wirings 2 and 3. However, if the repetition interval of the detection wirings in the touch screen according to the second embodiment is smaller than the interval of arrangement of the pixel pattern in the mounted display device, more than one wiring always cover each pixel, thereby reducing a transmittance of the touch screen. Accordingly, it is desirable that the repetition interval of the detection wirings 2 and 3 in the touch screen 1 according to the present embodiment is set to a value which is equal to or less than 1 mm but is larger than the interval of arrangement of the pixel pattern in the display panel to be mounted thereto.

In this case, if the repetition interval of the detection wirings 2 and 3 in the touch screen 1 is set to a small value equal to or less than 1 mm, this reduces the transmittance for display light passing through the touch screen 1, but this fact can be overcome by reducing the wiring width of the detection wirings 2 and 3. FIG. 6 illustrates results indicating this fact. Namely, FIG. 6 is a view illustrating the results of calculations for the relationship between the wiring width of the detection wirings 2 and 3 in the touch screen 1 structured according to the first embodiment and the transmittance for display light passing through the touch screen 1, in respective cases where the repetition interval of the detection wirings 2 and 3 is 0.1 mm and 1 mm. Further, it is assumed that the reflectivity of the detection wirings 2 and 3 is 100%. As clearly illustrated in FIG. 6, if the repetition interval of the detection wirings 2 and 3 is reduced, the transmittance is reduced, but this fact can be overcome by reducing the wiring width of the detection wirings 2 and 3.

Figure 7:
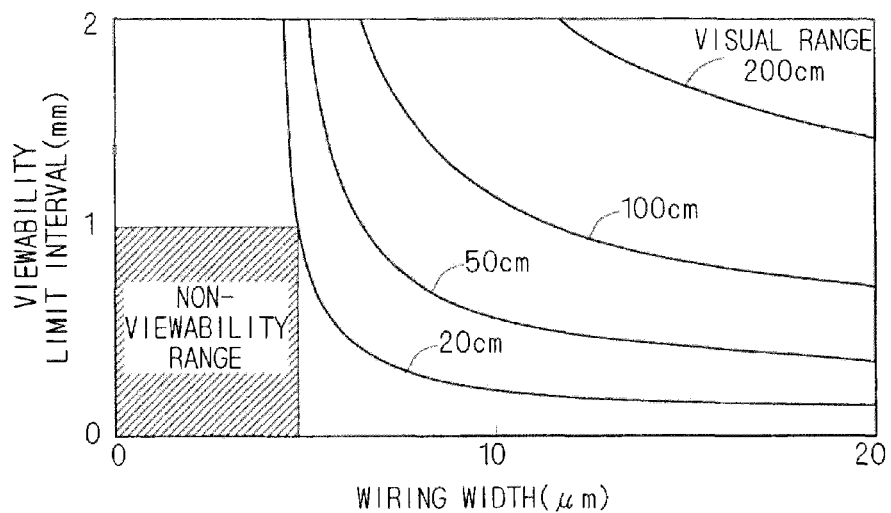
FIG. 7 is a view illustrating the relationship between the wiring width of the detection wirings and a viewability limit interval, according to the second embodiment.

FIG. 7 is a view illustrating the results of calculations indicating the relationship between a viewability limit interval and the wiring width of the detection wirings 2 and 3 in the touch screen 1 structured according to the first embodiment. In this case, the term "the viewability limit interval" refers to a lower limit value of the repetition interval of the detection wirings 2 and 3 which enables visually discriminating between the wiring areas and the background areas of the touch screen 1. The viewability limit interval was calculated using the following calculation equation (1).

$$\frac{\pi}{360\left(\frac{1}{\omega}\ln\frac{L^*m - L^*b}{A}\right)^{\frac{1}{\gamma}}} \quad (1)$$

L*$_m$ Reflection Brightness of Wiring Areas
L*$_b$ Reflection Brightness of Background Areas
σ, A, γ: Parameters Determined according to Spatial Resolution and Environment In this case, regarding the values of the parameters in the equation (1), for cases where the visual range is 20 cm, 50 cm, 100 cm and 200 cm, σ was set to 0.138, A was set to 0.472, and γ was set to 1.06 (in a case where the viewer is 20 years of age and views it in the daytime). Further, the value of the repetition interval of the detection wirings 2 and 3 (a value equal to or less than 1 mm), which is a premise of the calculation, is reflected on the reflection brightness L*$_m$ of the wiring areas, in the equation (1).

If the value of the repetition interval of the detection wirings 2 and 3 is set to be larger, this enables the viewer to easily and visually discriminate between the wiring areas and the background areas of the touch screen 1, which makes the value of the viewability limit interval larger. On the other hand, if the value of the repetition interval of the detection wirings 2 and 3 is set to be smaller, the wiring areas and the background areas of the touch screen 1 are made finer, which makes it harder to visually discriminate between the wiring areas and the background areas, thereby making the value of the viewability limit interval smaller. Further, with increasing wiring width of the detection wirings 2 and 3, the reflection brightness is increased due to the increase of the areas of the detection wirings 2 and 3, thereby reducing the value of the viewability limit interval.

As illustrated in FIG. 7, it can be understood that, if the wiring width of the detection wirings 2 and 3 is reduced to a certain extent, the value of the viewability limit interval is abruptly increased. In a case where the value of the repetition interval of the detection wirings 2 and 3 is set to a value equal to or less than 1 mm, when the wiring width of the detection wirings 2 and 3 is set to be equal to or less than 5 micrometers, the viewability limit interval is a large value equal to or larger than 1 mm, which enables setting the value of the repetition interval of the detection wirings 2 and 3 to be equal to or less than the viewability limit interval, thereby preventing the wiring patterns of the detection wirings 2 and 3 from being visually recognized.

Accordingly, in the structure according to the present embodiment, in cases where the value of the repetition interval of the detection wirings 2 and 3 is equal to or less than 1 mm, it can be said that it is desirable to set the wiring width of the detection wirings 2 and 3 to be equal to or less than 5 micrometers, in view of preventing the patterns of the detection wirings 2 and 3 from being visually recognized for preventing the degradation of the quality of the display on the display device.

Third Embodiment

The present embodiment is characterized in that a wiring width of the detection wirings 2 and 3 is set to be equal to or less than 10 micrometers, in a cases where (1) the detection column wirings 2 and the detection row wirings 3 are each structured to have a multi-layer structure constituted by an Al-based alloy and a layer made of nitride of the Al-based alloy and, also, (2) the value of the repetition interval of the detection wirings 2 and 3 is equal to or less than 1 mm.

Figure 8:
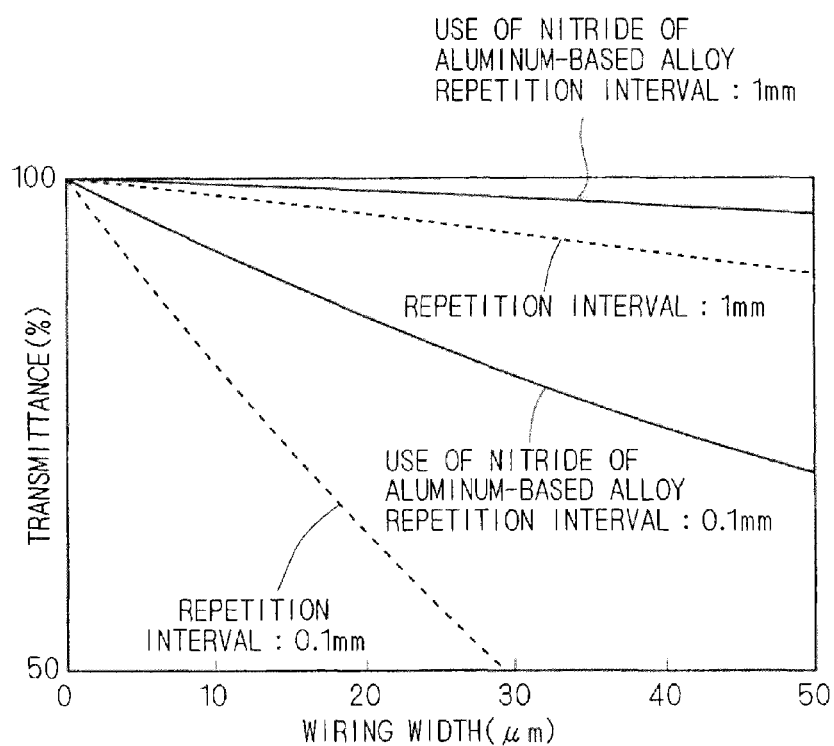
FIG. 8 is a view illustrating the relationship between a wiring width of the detection wirings and a transmittance, according to a third embodiment.

FIG. 8 is a view illustrating the results of calculations for the relationship between a wiring width of the detection wirings 2 and 3 and a transmittance of the touch screen 1, in a case where the detection wirings 2 and 3 in the touch screen 1 structured according to the first embodiment are structured to have a multi-layer structure constituted by an Al-based alloy and a layer of nitride of the Al-based alloy. FIG. 8 illustrates the result in a case where the repetition interval of the detection wirings 2 and 3 was 0.1 mm and the result in a case where it was 1 mm. In addition thereto, FIG. 8 illustrates, with broken lines, the results in a case where the reflectivity of the detection wirings 2 and 3 is 100%. The results in FIG. 8 reveals that, by forming the detection wirings 2 and 3 to have the multi-layer structure constituted by the Al-based alloy and the layer of the nitride of the Al-based alloy, which has a lower reflectivity than that of a structure constituted by only wirings (conductors) made of a single metal such as Al, it is possible to provide a larger transmittance, due to the reduction of the reflectivity of the detection wirings 2 and 3. Furthermore, by setting the wiring width of the detection wirings 2 and 3 to be smaller, it is possible to further increase the transmittance.

FIG. 9 is a view illustrating the results of calculations indicating the relationship between a viewability limit interval and a wiring width of the detection wirings in the touch screen structured according to the third embodiment. In this case, regarding the values of the parameters in the equation (1), for respective cases where the visual range is 20 cm, 50 cm and 100 cm, a was set to 0.138, A was set to 0.472 and γ was set to 1.06 (in a case where the viewer is 20 years of age and views it in the daytime). As illustrated in FIG. 9, it can be understood that, if the wiring width of the detection wirings is reduced, the viewability limit interval abruptly increases, at larger wiring width values than in the case of the second embodiment. Based on the results in FIG. 9, in a case where the repetition interval of the detection wirings is set to be equal to or less than 1 mm, when the wiring width of the detection wirings is set to be equal to or less than 10 micrometers, the viewability limit interval abruptly increases to a larger value equal to or larger than 1 mm, which enables setting the repetition interval of the detection wirings to be equal to or less than the viewability limit interval, thereby preventing the wiring pattern of the detection wirings from being visually recognized.

As described above, by employing the structure described in the present embodiment, it is possible to prevent the presence of the detection wirings from being easily recognized, which enables provision of a touch panel capable of facilitating the increase of its size and a display device including the same panel, without degrading the quality of the display on the display device and without reducing the capacitance detection sensitivity.

Forth Embodiment

Figure 10:
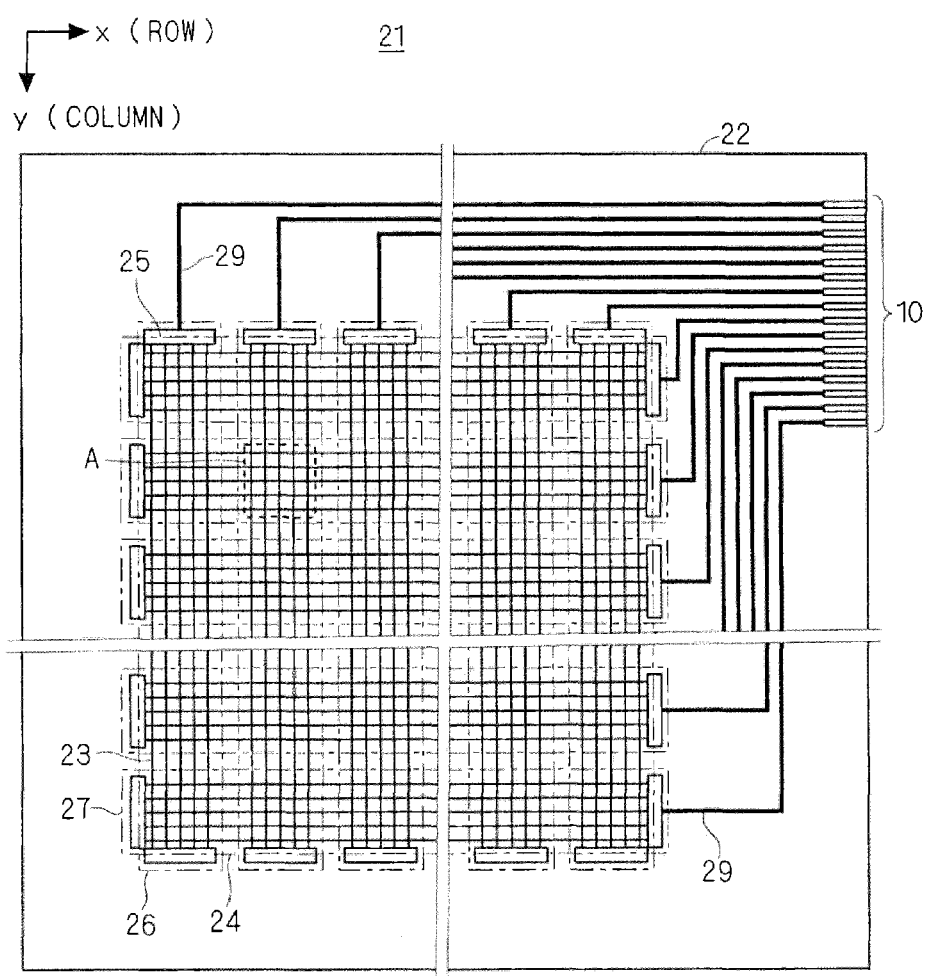
FIG. 10 is a plan view illustrating the structure of a touch screen according to a fourth embodiment of the present invention.

FIG. 10 is a plan view illustrating the entire structure of a touch screen included in a touch panel according to a fourth embodiment.

Figure 11:
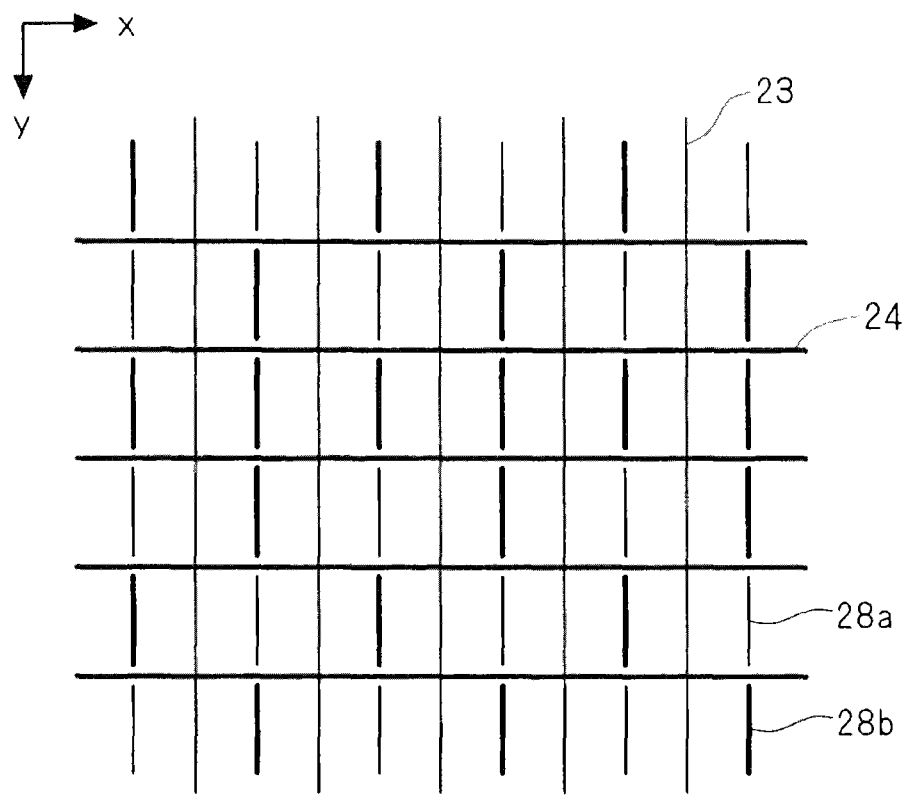
FIG. 11 is an enlarged view of a portion A in FIG. 10.

Further, FIG. 11 is an enlarged view of a portion A of FIG. 10 and is a plan view illustrating a portion of the wiring pattern in the touch screen. FIG. 12 is a plan view illustrating the connection between the touch screen and a controller substrate, and FIG. 13 is a perspective view schematically illustrating the layer structure of the touch screen.

At first, with reference to FIGS. 10 to 12, the structure of the touch screen in a planar direction will be described.

Referring to FIG. 10, the touch screen 21 includes a transparent substrate 22 having a touch surface and further includes, on a surface of the transparent substrate 22 which is opposite from the touch surface thereof, a plurality of detection column wirings 23 (first wirings) which are arranged in a row direction (the X direction in FIG. 10) at predetermined intervals and are straightly extended in a column direction (the Y direction in FIG. 10) and, further, a plurality of detection row wirings 24 (second wirings) which are arranged in the column direction at predetermined intervals and are straightly extended in the row direction in such a way as to orthogonally intersect with the detection column wirings 23. Further, although, in FIG. 10, the detection column wirings 23 and the detection row wirings 24 are placed such that they orthogonally intersect with each other, both the wirings are required only to be placed such that they intersect with each other, and it is not necessarily necessary that the detection column wirings 23 and the detection row wirings 24 orthogonally intersect with each other.

Further, the predetermined number (5 in FIG. 10) of detection column wirings 23 are electrically short-circuited at their opposite ends through a connection wiring 25 to constitute a single bundle 26 of wirings in the column direction. Similarly, the predetermined number (5 in FIG. 10) of detection row wirings 24 are electrically short-circuited at their opposite ends through a connection wiring 25 to constitute a single bundle 27 of wirings in the row direction.

Further, it is desirable that the intervals of the arrangement of the detection column wirings 23 and the detection row wirings 24 (hereinafter, the detection column wirings and the detection row wirings will be comprehensively referred to as "detection wirings") fall within the range of 0.1 to 1 mm.

Further, the predetermined number of bundles 26 of wirings in the column direction are arranged in parallel in the row direction at intervals and, similarly, the predetermined number of bundles 27 of wirings in the row direction are arranged in parallel in the column direction at intervals, so that the transparent substrate 22 is divided, at its upper side, into a plurality of areas, by the predetermined number of the bundles 26 of wirings in the column direction and the predetermined number of the bundles 27 of wirings in the row direction.

Further, the number of the bundles 26 of wirings in the column direction, the number of the bundles 27 of wirings in the row direction, and the numbers of the detection wirings 23 and 24 constituting the bundles 26 of wirings in the column direction and the bundles 27 of wirings in the row direction are determined as required, according to the required resolution of the touch screen.

Further, as illustrated in FIG. 11 illustrating the portion A in FIG. 10 in an enlarging manner, there are placed isolated wirings 28a and 28b (third wirings) as dummy wirings in the plurality of areas enclosed by the detection column wirings 23 and the detection column wirings 24. The isolated wirings 28a and 28b are segmented into predetermined sizes and are formed at a state where they are electrically insulated from the detection wirings 23 and 24. Further, the isolated wirings 28a and 28b are placed in parallel with the detection column wirings 23, and the wirings including the isolated wirings 28a and 28b are arranged, such that the wiring intervals are not equal to integral multiples of the display pixel interval in a display device, such as an LCD or a CRT, which will be described later.

In the present embodiment, the detection column wirings 23, the detection row wirings 24 and the isolated wirings 28a and 28b are made of an aluminum alloy and, also, have an aluminum nitride layer formed at their surfaces closer to the touch surface 22a, but the materials of the detection column wirings 23, the detection row wirings 24 and the isolated wirings 28a and 28b are not limited thereto and can be any layers having higher conductivities than that of a transparent conductive layer made of indium oxide or the like. If their thicknesses can be made larger, this can reduce their resistances without increasing the wiring widths, which enables increasing the size of the touch screen. Accordingly, these wirings can be made of an intermetallic compound, such as metal silicide, titanium nitride (TiN), aluminum nitride (AlN). Further, in the present embodiment, it is desirable that the detection column wirings 23, the detection row wirings 24 and the isolated wirings 28a and 28b all have the same wiring width, and their wiring width is equal to or less than 10 micrometers.

Further, as will be described later, the isolated wirings 28a and 28b are formed to in different layers, and the isolated wirings 28a and 28b are alternately placed in the areas enclosed by the detection column wirings 23 and the detection row wirings 24, in order to prevent the isolated wirings 28a or the isolated wirings 28b which are formed in the same layer from being adjacent to one another.

Also, the placement pattern of the isolated wirings 28a and 28b is not limited to that of the aspect illustrated in FIG. 11, and the isolated wirings 28a and 28b can be placed in parallel with the detection row wirings 24 or vertically to the detection column wirings 24 or the detection row wirings 23. Also, the isolated wirings 28a and 28b can be mixed with each other. Further, the wiring lengths of the isolated wirings 28a and 28b, the numbers of the placed isolated wirings 28a and 28b and the like can be changed as required and, also, the isolated wirings 28a and 28b can be formed to have a dot shape, instead of a line shape.

Further, the bundles 26 of wirings in the column direction and the bundles 27 of wirings in the row direction are electrically connected to terminals 10 through deriving wirings 29 which are electrically connected to the connection wirings 25. As illustrated in FIG. 12, terminals 111 in an FPC (Flexible Printed Circuit) 111 formed from an ACF (Anisotropic Conductive Film) and the like are connected to the terminals 10. Further, the FPC 111 is electrically connected to a controller substrate 131 having a detection processing circuit 121 mounted thereon.

Next, with reference to FIG. 13, the structure of the touch screen 21 in a thickwise direction will be described.

FIG. 13 is a view schematically illustrating the structure of the touch screen 21 in the thickwise direction. Referring to FIG. 13, the outermost surface layer of the touch screen 21 is formed from a rectangular transparent substrate 22 made of a transparent glass material or a transparent resin, and a touch surface 22a is formed at the surface thereof. On the surface of the transparent substrate 22 opposite from the touch surface 22a, the plurality of detection column wirings 23 are arranged in the row direction at predetermined intervals. Further, on the lower surface thereof, an interlayer insulation layer 141, which is a transparent insulation layer made of a silicon nitride layer or a silicon oxide layer, is formed such that it covers the detection column wirings 23. On a lower surface of the interlayer insulation layer 141, the plurality of detection row wirings 24 are arranged in the column direction at predetermined interval. Further, on the lower surface thereof, there is formed a protective layer 151 for protecting the detection row wirings 24. Also, it is possible to reverse the layers in which the detection column wirings 23 and the detection row wirings 24 are formed, such that the detection row wirings 24 are formed on a back surface of the transparent substrate 22, and the detection column wirings 23 are formed on the lower surface of the interlayer insulation layer 141.

In this case, although not illustrated in FIG. 13, the isolated wirings 28a are formed in the layer in which the detection column wirings 23 are formed, while the isolated wirings 28b are formed in the layer in which the detection row wirings 24 are formed.

Further, a display device (not illustrated), such as an LCD or CRT, is placed on a lower surface of the protective layer 151.

Next, there will be described the operations of the touch screen 21. If a pointing body, such as a finger, touches an arbitrary position on the touch surface 22a of the transparent substrate 22 constituting the outermost surface of the touch screen 21, a capacitance is formed between the pointing body and a detection column wiring 23 or a detection row wiring 24. The detection processing circuit 121 mounted on the controller substrate 131 calculates the position (the coordinates) at which the capacitance changes is induced, and the values of the coordinates of the position touched by the pointing body, which have been calculated by the detection processing circuit 121, are outputted to an external computer (not illustrated).

In this case, since the isolated wirings 28a and 28b as dummy wirings are placed in the plurality of areas enclosed by the detection column wirings 23 and the detection row wirings 24, it is possible to uniformize the transmittance of the entire touch screen for light, even though the detection column wirings 23 and the detection row wirings 24 are formed from a non-transparent conductive material. This can largely reduce the unevenness of the display on the touch screen without reducing the response speed, which realizes a touch screen with excellent viewability. Furthermore, since the isolated wirings 28a and 28b are electrically insulated from the detection wirings 23 and 24, by increasing the interval of the arrangement of the detection wirings 23 and 24 for decreasing the density of the detection wirings 23 and 24, it is possible to reduce the parasitic capacitances among the wirings, thereby suppressing the delays in the wirings.

Further, since the isolated wirings 28a and 28b are placed in the plurality of areas enclosed by the detection column wirings 23 and the detection row wirings 24 and, also, the intervals of the wirings including the isolated wirings 28a and 28b are prevented from being equal to integral multiples of the pixel interval in the display device such as an LCD or CRT, it is possible to alleviate moires induced by the interference of the pixel interval in the display device with the interval of the arrangement of the detection wirings 23 and 24.

Further, since the isolated wirings 28a and 28b are placed in parallel with the detection column wirings 23, it is possible to further improve the uniformity of a light transmittance of the touch screen and, further, it is possible to facilitate the fabrication of the isolated wirings 28a and 28b.

Further, since each predetermined number of detection wirings, out of the detection wirings 23 and 24, are short-circuited at their opposite ends to form a bundle of wirings 26, 27, even if a single detection wiring 23 or 24 in the bundles 26 or 27 of wirings is broken, it is possible to detect the capacitance change at the touched position, from the other detection wirings, thereby enabling detection of the touched position with excellent reliability.

Further, since the detection wirings 23 and 24 are made of an aluminum alloy, it is possible to make the electric resistances of these wirings lower, which results in provision of a touch screen having a higher response speed and being capable of facilitating increasing of its size.

Further, since the detection wirings 23 and 24 and the isolated wirings 28a and 28b which are made of an aluminum alloy are formed to include, at their sides closer to the touch surface 22a, an aluminum nitride layer having a lower light reflectivity than that of the aluminum alloy, it is possible to reduce the display unevenness in the touch screen.

Further, since the detection wirings 23 and 24 and the isolated wirings 28a and 28b are formed to be thin wires with a wiring width equal to or less than 10 micrometers, it is possible to provide a touch screen with excellent viewability which prevents the wirings from being easily viewed from the outside.

According to the present embodiment, since the isolated wirings 28a and 28b are placed in the plurality of areas enclosed by the detection column wirings 23 and the detection row wirings 24, it is possible to uniformize the light transmittance of the touch screen, even though the detection column wirings 23 and the detection row wirings 24 are made of a non-transparent conductive material. This enables provision of a touch screen having a high response speed and excellent viewability and being capable of suppressing display unevenness and moires and capable of facilitating increasing of its size.

Fifth Embodiment

Figure 14:
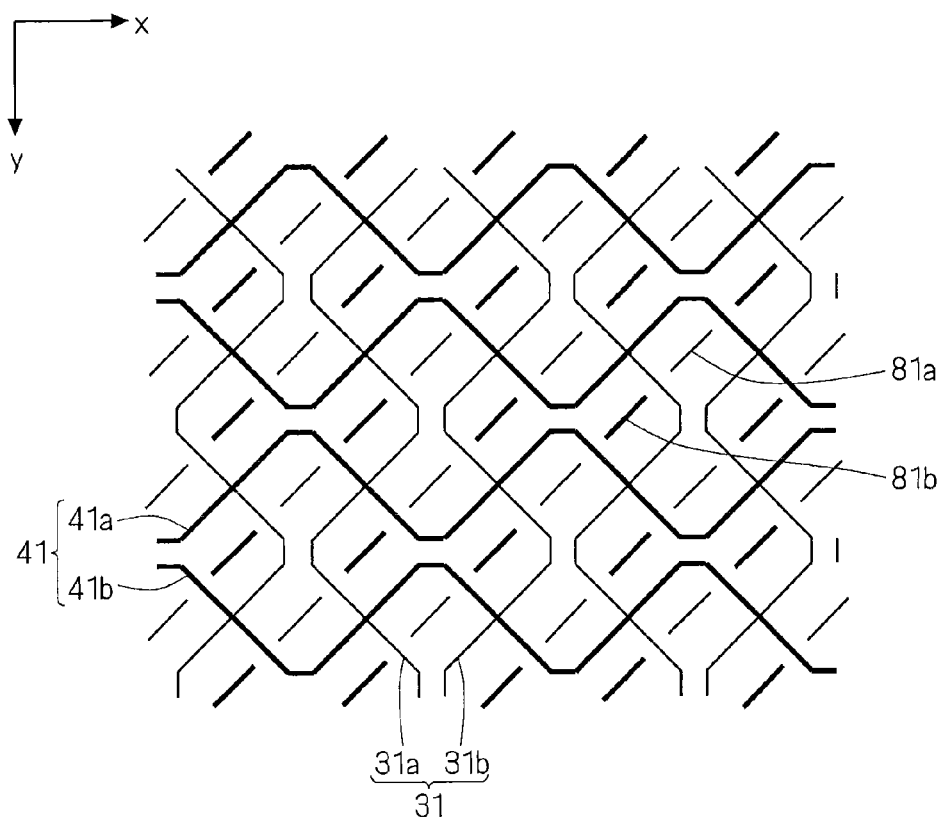
FIG. 14 is a plan view illustrating, in an enlarging manner, a portion of the detection wiring pattern in the touch screen according to the fifth embodiment.

FIG. 14 is a plan view illustrating, in an enlarging manner, a portion of the detection wiring pattern in a touch screen according to a fifth embodiment. Further, FIGS. 15A and 15B are a view illustrating a distribution of a light transmittance of the touch screen, along with a comparison example.

Referring to FIG. 14, detection column wirings 31 (first wirings) in the touch screen are placed, such that pairs of zigzag wirings 31a and 31b which are axisymmetric with respect to a column direction (a Y direction in FIG. 14) are arranged at predetermined intervals in a row direction (an X direction in FIG. 14), and adjacent wirings are axisymmetric with respect to the column direction. Similarly, detection row wirings 41 (second wirings) are placed, such that pairs of zigzag wirings 41a and 41b which are axisymmetric with respect to the row direction are arranged at predetermined intervals in the column direction, and adjacent wirings are axisymmetric with respect to the row direction. Further, in both of the detection column wirings 31 and the detection row wirings 41, each of the sides forming the zigzags forms an angle of 45 degrees with respect to the row direction, and the detection column wirings 31 and the detection row wirings 41 are placed such that they orthogonally intersect with each other, at the middle points of their respective sides forming the zigzag patterns.

Further, similarly to in the fourth embodiment, each predetermined number of detection column wirings 31 and each predetermined number of detection row wirings 41, out of the predetermined numbers of detection column wirings 31 and detection row wirings 41, are electrically short-circuited at their opposite ends, through a connection wiring (not illustrated), so that a plurality of bundles of wirings in the column direction and a plurality of bundles of wirings in the row direction are formed.

Further, there are placed isolated wirings 81a and 81b (third wirings) as dummy wirings in the plurality of areas enclosed by the detection column wirings 31 and the detection row wirings 41. The isolated wirings 81a are formed in the layer in which the detection column wirings 31 are formed, while the isolated wirings 81b are formed in the layer in which the detection row wirings 41 are formed. Further, the isolated wirings 81*a* and 81*b* are oriented such that they form an angle of 45 degrees with respect to the row direction or the column direction, similarly to the detection column wirings 31 or the detection row wirings 41.

Further, in the present embodiment, it is desirable that the detection column wirings 31, the detection row wirings 41 and the isolated wirings 81*a* and 81*b* all have the same wiring width, and their wiring width is equal to or less than 10 micrometers.

Further, it is desirable that the intervals of the arrangement of the pairs of detection column wirings 31 and the pairs of detection row wirings 41 fall within the range of 0.1 to 1 mm.

Except the aforementioned points, the present embodiment has the same structure as that of the fourth embodiment.

Figure 15:
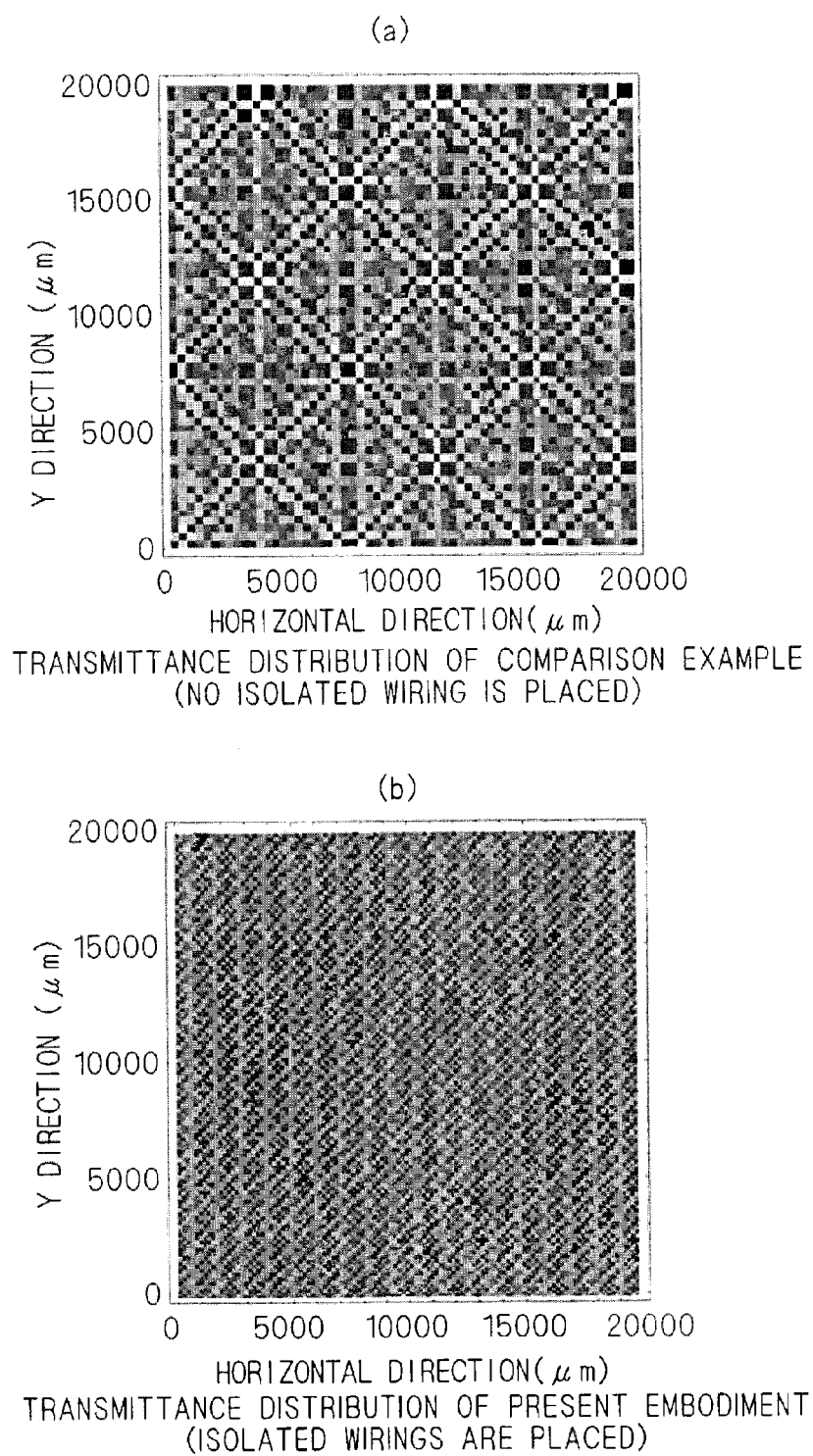
FIGS. 15A and 15B are a view illustrating a distribution of a light transmittance of the touch screen according to the fifth embodiment, along with a comparison example.

FIG. 15 is a view illustrating a distribution of a light transmittance of the touch screen having the aforementioned structure and a distribution of the light transmittance of a touch screen (a comparison example) having a structure including no isolated wirings placed therein, wherein (a) portion of FIG. 15 illustrates a transmittance distribution of the touch screen of the comparison example at a state where it is mounted to a display device, and (b) portion of FIG. 15 illustrates a transmittance distribution of the touch screen according to the present embodiment at a state where it is mounted to a display device.

As illustrated in (a) portion of FIG. 15, the touch screen of the comparison example exhibits repetitive display unevenness, while, in the touch screen according to the present embodiment illustrated in (b) portion of FIG. 15, substantially no repetitive display unevenness is visually observed.

As described above, since the isolated wirings 81*a* and 81*b* are placed in the plurality of areas enclosed by the detection column wirings 31 and the detection row wirings 41, it is possible to uniformize the light transmittance of the entire touch screen, even though the detection column wirings 31 and the detection row wirings 41 are formed from a non-transparent conductive material. This can largely reduce the display unevenness in the touch screen without reducing the response speed, thereby realizing a touch screen with excellent viewability. Furthermore, since the isolated wirings 81*a* and 81*b* are electrically insulated from the detection wirings 31 and 41, by increasing the intervals of the arrangement of the detection wirings 31 and 41 for decreasing the density of the detection wirings 31 and 41, it is possible to reduce the parasitic capacitances among the wirings, thereby suppressing the delays in the wirings.

Further, since the detection wirings 31 and 41 are both formed to have zigzag shapes and, also, adjacent wirings, out of them, are symmetric, it is possible to further improve the uniformity of the light transmittance. Further, since the detection column wirings 31 and the detection row wirings 41 are placed such that they orthogonally intersect with each other at the middle points of their respective sides forming these zigzag patterns, it is possible to uniformize the light transmittance with excellent balance, thereby providing a touch screen with excellent viewability which can suppress display unevenness.

Further, since the directions of the orientation of the respective zigzag-shaped sides of the detection wirings 31 and 41 and the isolated wirings 81*a* and 81*b* are made to form an angle of 45 degrees with respect to the row direction, it is possible to further suppress the occurrence of moires caused by the interference of the wiring intervals with the interval of the pixels in the display device having pixels arranged in the column direction and the row direction.

According to the present embodiment, since the isolated wirings 81*a* and 81*b* are placed in the plurality of areas enclosed by the zigzag-shaped detection column wirings 31 and the zigzag-shaped detection row wirings 41, it is possible to uniformize the light transmittance of the touch screen, even though the detection column wirings 23 and the detection row wirings 24 are made of a non-transparent conductive material. This enables provision of a touch screen having a high response speed and excellent viewability and being capable of suppressing display unevenness and moires and capable of facilitating increasing of its size.

Sixth Embodiment

FIG. 16 is a plan view illustrating, in an enlarging manner, a portion of the detection wiring pattern in a touch screen according to a sixth embodiment of the present invention.

Referring to FIG. 16, branch wirings 82*a* and 82*b* as third wirings are placed in the areas enclosed by detection column wirings 31 (first wirings) and detection row wirings 41 (second wirings) of the touch screen. In this case, the branch wirings 82*a* are formed in the layer in which the detection column wirings 31 are formed, and the branch wirings 82*a* are each electrically connected at their opposite ends to a detection column wiring 31. Further, the branch wirings 82*a* each electrically connect adjacent detection column wirings 31, in a bundle of wirings in the column direction, to each other.

Similarly, the branch wirings 82*b* are formed in the layer in which the detection column wirings 41 are formed, and the branch wirings 82*b* are each electrically connected at their opposite ends to a detection column wiring 41. Further, the branch wirings 82*b* each electrically connect adjacent detection row wirings 41, in a bundle of wirings in the row direction, to each other.

Further, detection column wirings 31 or detection row wirings 41 which are adjacent to each other but are included in different bundles of wirings are not electrically connected to each other. Further, the main portions of the branch wirings 82*a* and 82*b* are placed to form an angle of 45 degrees with respect to the column direction or the row direction.

Further, in the present embodiment, it is desirable that the detection column wirings 31, the detection row wirings 41 and the branch wirings 82*a* and 82*b* all have the same wiring width, and their wiring width is equal to or less than 10 micrometers.

Except the aforementioned points, the present embodiment has the same structure as that of the fifth embodiment.

Since adjacent detection wirings 31 and 41 in the bundles of wirings are electrically connected to each other through the branch wirings 82*a* and 82*b*, it is possible to suppress the display unevenness and moires in the touch screen similarly to in the fifth embodiment, even though the detection wirings 31 and 41 are made of a non-transparent conductive material. Further, even if the detection wirings in the bundles of wirings are broken at a portion thereof, it is possible to transmit the capacitance change to the controller substrate 131 (FIG. 12) through the detection wiring adjacent thereto. This enables detection of the touched position with excellent reliability.

Further, since the zigzag-shaped detection wirings 31*a* and 31*b* or 41*a* and 41*b* are electrically connected to each other at their portions closer to each other, it is possible to detect the touched position with higher reliability.

According to the present embodiment, since the branch wirings 82*a* and 82*b* are placed in the plurality of areas enclosed by the zigzag-shaped detection row wirings 31 and the zigzag-shaped detection column wirings 41 and, further, adjacent detection wirings 31 and 41 in the bundles of wirings are electrically connected to each other through the branch wirings 82a and 82b, it is possible to suppress the display unevenness and moires in the touch screen and to enable detection of the touched position with high reliability.

Seventh Embodiment

Figure 17:
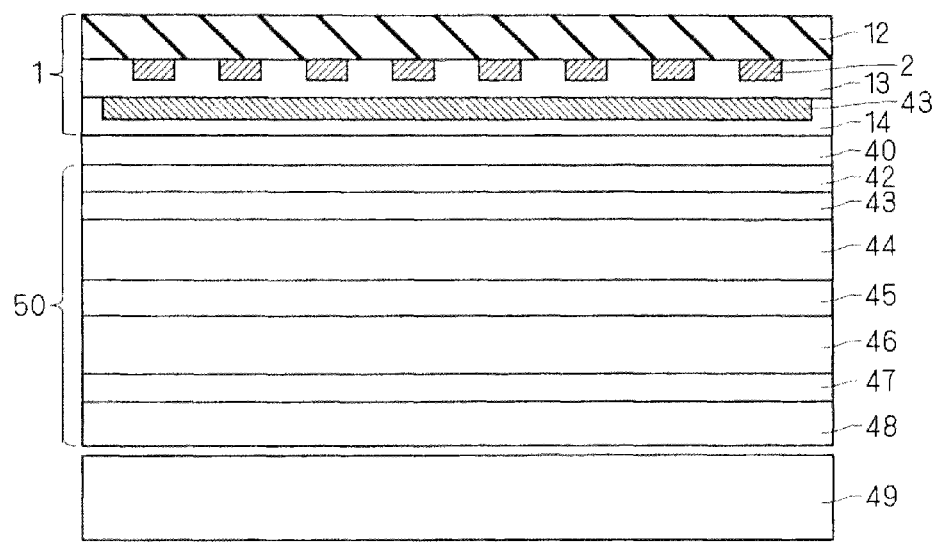
FIG. 17 is a cross-sectional view illustrating the structure of a liquid crystal display device according to a seventh embodiment of the present invention.

FIG. 17 is a view illustrating the cross-sectional structure of a liquid crystal display device according to the present embodiment, in the substrate-thickwise direction. A liquid crystal display panel 50 includes a color filter substrate 44 constituted by a glass substrate and color filters, a black matrix, transparent electrodes and an orientation layer which are formed on the glass substrate; a TFT array substrate 46 constituted by a glass substrate and TFTs (thin-film transistors) as switching devices and the like which are formed on the glass substrate; a liquid crystal layer 45 made of a TN (Twisted Nematic) liquid crystal sandwiched between both the substrates 44 and 46; and a polarization plate 48 attached to a back surface of the TFT array substrate 46 through an attachment layer 47. Further, a polarization plate 42 is attached through an attachment layer 43 to a front surface of the color filter substrate 44. Further, a back light 49 as a light source is placed at the back-surface side of the liquid crystal display panel 50.

On the other hand, the touch screen 1 according to the first embodiment is attached to the polarization plate 42 at the front-surface side of the liquid crystal display panel 50, through an attachment layer 40.

An external driver circuit (not illustrated) inputs signals corresponding to to-be-displayed images to the TFT array substrate 46 and, in response thereto, the TFT array substrate 46 controls the voltage applied to the liquid crystal layer 45 through the switching devices constituted by the TFTs formed for the respective pixels for changing the direction of orientation of the liquid crystal molecules. Incident light from the back light 49 passes through the polarization plate 48 to become linearly-polarized light and, then, passes through the liquid crystal layer 45 to be bent in the direction of its vibration, according to the to-be-displayed image signals. Then, the light passes through the color filters formed on the color filter substrate 44 to be divided into light in three primary colors. Then, the light passes through the polarization plate 42 at the front-surface side to become light with light intensity corresponding to the image signals. Further, the light passed through the polarization plate 42 passes through the touch screen 1 on the front surface thereof and is viewed as display light by a user.

As described above, the liquid crystal display device performs desired display, by controlling the transmittance for light from the back light 49 according to image signals. Further, the touch panel including the touch screen 1 calculates the touched coordinates based on the change of the oscillation period and outputs the touched coordinates, similarly to in the first embodiment.

In this case, in the touch screen 1 described in the first embodiment, the opening portion between adjacent detection wirings, out of the groups of detection wirings constituted by the plurality of detection wirings, is made to have a larger area, which suppresses the reduction of the transmittance for display light, thereby causing most of the light passed through the polarization plate 42 to pass through the touch screen 1 to become display light. Accordingly, even though the touch screen 1 is placed on a front surface of the liquid crystal display panel 50, the display luminance is hardly reduced.

Also, other liquid crystals than TN liquid crystals, such as STN (Super Twisted Nematic) liquid crystals, can be employed and, in this case, similarly, it is possible to form a liquid crystal display device, similarly to in the present embodiment.

Although, in the present embodiment, the liquid crystal display has been described as a display device, it is also possible to apply the present embodiment to other types of display devices, such as organic or inorganic EL (Electro Luminescence) display devices or PDPs (Plasma Display Panels).

According to the present embodiment, the touch screen 1 is attached to the liquid crystal display panel 50 for integrating them with each other to form a display device, which enables eliminating a mechanism for holding the touch screen which has been necessary in the related art, thereby reducing the thickness of the entire device.

Further, since the touch screen 1 and the liquid crystal display panel 50 are integrated with each other to constitute the display device, it is possible to prevent foreign substances such as dusts from intruding into the gap between the touch screen 1 and the liquid crystal display panel 50 to affect the display.

Although embodiments of the present invention have been disclosed and described in detail, the above descriptions merely illustrate aspects to which the present invention is applicable, and the present invention is not limited thereto. Namely, various modifications and changes can be made to the described aspects, without departing from the range of the present invention.

While the invention has been shown and described in detail, the foregoing description is in all aspects illustrative and not restrictive. It is therefore understood that numerous modifications and variations can be devised without departing from the scope of the invention.

The invention claimed is:

1. A touch screen comprising a plurality of detection column wirings each extending in a column direction and a plurality of detection row wirings each extending in a row direction which are placed such that they are spatially intersected with each other on a surface of a transparent base substrate with an insulation layer interposed therebetween, each predetermined number of detection column wirings, out of said plurality of detection column wirings, being electrically connected to one another at their respective opposite ends to constitute a bundle of wirings in the column direction, and each bundle of wirings in the column direction being constituted by detection column wirings which belong to this bundle of wirings in the column direction and are repeatedly arranged in the row direction at predetermined intervals, and each predetermined number of detection row wirings, out of said plurality of detection row wirings, being electrically connected to one another at their respective opposite ends to constitute a bundle of wirings in the row direction, and each bundle of wirings in the row direction being constituted by detection row wirings which belong to this bundle of wirings in the row direction and are repeatedly arranged in the column direction at predetermined intervals, wherein dummy wirings are provided in the respective plurality of areas enclosed by said plurality of detection column wirings and said plurality of detection row wirings.

2. The touch screen according to claim 1, wherein
said dummy wirings are electrically insulated from both said detection row wirings and said detection column wirings.

3. The touch screen according to claim 1, wherein
said dummy wirings are parallel or vertical to said detection row wirings or said detection column wirings.

4. The touch screen according to claim 1, wherein
said detection column wirings are constituted by a set of a first metal wiring having a zigzag pattern and a second metal wiring having a structure axisymmetric with said first metal wiring about said column direction as an axis, and the first metal wiring is constituted by first sloped portions which are obliquely sloped by a predetermined angle with respect to said column direction and first parallel portions which are parallel with said column direction and are continuous with said first sloped portions, such that said first sloped portions and said first parallel portions are repeatedly placed along said column direction, said detection row wirings are constituted by a set of a third metal wiring having a zigzag pattern and a fourth metal wiring having a structure axisymmetric with the third metal wiring about said row direction as an axis, and the third metal wiring is constituted by second sloped portions which are obliquely sloped by a predetermined angle with respect to said row direction and second parallel portions which are parallel with said row direction and are continuous with said second sloped portions, such that said second sloped portions and said second parallel portions are repeatedly placed along said row direction, in each area in which an arbitrary single detection column wiring out of said plurality of detection column wirings and an arbitrary single detection row wiring out of said plurality of detection row wirings are spatially intersected with each other, a single sloped portion out of the two first sloped portions of said first metal wiring belonging to said area is spatially intersected with a single sloped portion out of the two second sloped portions of said third metal wiring belonging to said area, and the other sloped portion out of the two first sloped portions of said first metal wiring belonging to said area is spatially intersected with a single sloped portion out of the two second sloped portions of said fourth metal wiring belonging to said area, and a single sloped portion out of the two first sloped portions of said second metal wiring belonging to said area is spatially intersected with the other sloped portion out of the two second sloped portions of said third metal wiring belonging to said area, and the other sloped portion out of the two first sloped portions of said second metal wiring belonging to said area is spatially intersected with the other sloped portion out of the two second sloped portions of said fourth metal wiring belonging to said area.

5. The touch screen according to claim 4, wherein
a single sloped portion out of the two first sloped portions of said first metal wiring is spatially and orthogonally intersected with a single sloped portion out of the two second sloped portions of said third metal wiring, the other sloped portion out of the two first sloped portions of said first metal wiring is spatially and orthogonally intersected with a single sloped portion out of the two second sloped portions of said fourth metal wiring, a single sloped portion out of the two first sloped portions of said second metal wiring is spatially and orthogonally intersected with the other sloped portion out of the two second sloped portions of said third metal wiring, and the other sloped portion out of the two first sloped portions of said second metal wiring is spatially and orthogonally intersected with the other sloped portion out of the two second sloped portions of said fourth metal wiring.

6. The touch screen according to claim 4, wherein
a single sloped portion out of the two first sloped portions of said first metal wiring is intersected with a single sloped portion out of the two second sloped portions of said third metal wiring, at the middle points of the respective sloped portions, the other sloped portion out of the two first sloped portions of said first metal wiring is spatially and orthogonally intersected with a single sloped portion out of the two second sloped portions of said fourth metal wiring, at the middle points of the respective sloped portions, a single sloped portion out of the two first sloped portions of said second metal wiring is spatially and orthogonally intersected with the other sloped portion out of the two second sloped portions of said third metal wiring, at the middle points of the respective sloped portions, and the other sloped portion out of the two first sloped portions of said second metal wiring is spatially and orthogonally intersected with the other sloped portion out of the two second sloped portions of said fourth metal wiring, at the middle points of the respective sloped portions.

7. The touch screen according to claim 1, wherein
said detection column wirings are inclined by an inclination angle of 45 degrees with respect to the column direction, and said detection row wirings are inclined by an inclination angle of 45 degrees with respect to the row direction.

8. The touch screen according to claim 4, wherein
said dummy wirings are parallel with said first sloped portions or said second sloped portions.

9. The touch screen according to claim 1, wherein
said dummy wirings are electrically connected to said detection row wirings or said detection column wirings.

10. A touch panel comprising:
said touch screen according to claim 1;
a switching circuit which selects, in order, each of said plurality of detection column wirings and each of said plurality of detection row wirings; and
a detection processing circuit which performs processing for calculating the touched coordinates at the position on said touch screen which has been touched by a pointing body, based on the result of detection of a touch capacitance constituted by the capacitance formed between a detection column wiring selected by said switching circuit and said pointing body touching a surface of said transparent base substrate, and the capacitance formed between a detection column wiring selected by said switching circuit and said pointing body.

11. A display device comprising;
said touch panel according to claim 10; and
a display panel mounted to said touch screen in said touch panel;
wherein said column direction of said touch screen is parallel with the column direction of the pixel pattern in said display panel, and said row direction of said touch screen is parallel with the row direction of said pixel pattern in said display panel.

* * * * *